United States Patent
Baryudin et al.

(10) Patent No.: US 10,289,321 B1
(45) Date of Patent: May 14, 2019

(54) BAD BLOCK TABLE RECOVERY IN A SOLID STATE DRIVES

(71) Applicant: Amazon Technologies, Inc., Reno, NV (US)

(72) Inventors: Leonid Baryudin, San Jose, CA (US); Phillip Peterson, Seattle, WA (US); Daniel Sladic, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/588,488

(22) Filed: May 5, 2017

(51) Int. Cl.
- G06F 3/06 (2006.01)
- G06F 9/4401 (2018.01)
- G06F 13/42 (2006.01)
- G06F 12/02 (2006.01)

(52) U.S. Cl.
CPC .......... G06F 3/0619 (2013.01); G06F 3/0655 (2013.01); G06F 3/0679 (2013.01); G06F 9/442 (2013.01); G06F 13/4282 (2013.01); G06F 12/0246 (2013.01)

(58) Field of Classification Search
CPC .... G06F 3/0619; G06F 13/4282; G06F 9/442; G06F 3/0679; G06F 3/0655; G06F 12/0246
See application file for complete search history.

(56) References Cited

U.S. PATENT DOCUMENTS

| | | | |
|---|---|---|---|
| 2004/0128582 A1* | 7/2004 | Chou | G06F 11/1092 714/5.11 |
| 2006/0053246 A1* | 3/2006 | Lee | G06F 9/4403 711/100 |
| 2007/0014136 A1* | 1/2007 | Ali | G11C 29/76 365/1 |
| 2009/0282301 A1* | 11/2009 | Flynn | G06F 11/006 714/710 |
| 2011/0258367 A1* | 10/2011 | Tanaka | G06F 1/3203 711/103 |
| 2012/0265921 A1* | 10/2012 | Post | G06F 12/0638 711/103 |
| 2013/0145085 A1* | 6/2013 | Yu | G06F 12/0246 711/103 |
| 2014/0122781 A1* | 5/2014 | Smith | G06F 11/1441 711/103 |
| 2014/0325117 A1* | 10/2014 | Canepa | G06F 12/0246 711/103 |
| 2017/0277588 A1* | 9/2017 | Kim | G06F 11/0793 |
| 2018/0095680 A1* | 4/2018 | Peterson | G06F 3/0643 |

* cited by examiner

*Primary Examiner* — Tuan V Thai
*Assistant Examiner* — Tasnima Matin
(74) *Attorney, Agent, or Firm* — Hogan Lovells US LLP

(57) ABSTRACT

Spatially coupled journals include information for every portion of physical media, including defective, or "bad", blocks. Because data cannot be stored to bad blocks, a bad block table is needed before a solid state drive (SSD) can be accessed. Using the information already stored in the journals, the bad block table can be rebuilt following a loss of power. To ensure the journals can be located, a small seed can be stored in off band storage. The seed can include information pointing to a boot catalog stored on the SSD. The boot catalog can be used to determine the locations of journals, which may vary from their predetermined locations depending on the bad blocks of the drive. By storing a small seed, rather than an entire bad block table, the size of external storage needed to maintain the bad block table is reduced.

20 Claims, 8 Drawing Sheets

|  | Die 0 | Die 1 | Die 2 | Die 3 | Die 4 |
|---|---|---|---|---|---|
| Page 0 | 0 | 3 | 6 | 9 | 12 |
| Page 1 | 1 | 4 | 7 | 10 | 13 |
| Page 2 | 2 | 5 | 8 | 11 | 14 |
| Page 3 | 15 | 18 | 21 | 24 | 27 |
| Page 4 | 16 | 19 | 22 | 25 | 28 |
| Page 5 | 17 | 20 | 23 | 26 | 29 |

FIG. 3

BAD BLOCK TABLE RECOVERY IN A SOLID STATE DRIVES

BACKGROUND

Virtualized computing environments are frequently supported by storage systems, such as block-based storage. Such storage is increasingly provided by solid state drives (SSDs). SSDs provide a block-style interface, making it easy to integrate these drives into systems that have traditionally relied on hard drives and other block storage devices. SSD drive manufacturers incorporate a controller which provides the block-style interface and which manages data storage and mapping. For example when a read or write request is received, it may include a logical block address associated with the request. The controller may determine a physical location on the SSD from where the data should be read, or to where the data should be written. The controller may also manage data storage on the SSD to improve the longevity of the device and manage other flash-specific functions. However, while the drive manufacturer may provide a controller that is suitable for the average customer, such controllers may not provide sufficient flexibility or customizability for all users and applications for which such drives may be deployed.

BRIEF DESCRIPTION OF THE DRAWINGS

Various embodiments in accordance with the present disclosure will be described with reference to the drawings, in which:

FIG. 3 illustrates a diagram of a flash array in accordance with various embodiments.

DETAILED DESCRIPTION

Systems and methods in accordance with various embodiments of the present disclosure overcome one or more of the aforementioned and other deficiencies experienced in conventional approaches to managing solid state drives (SSDs) in a storage service, such as a block-based storage service, in an electronic environment. In particular, SSD management features may be decoupled from a built in SSD controller and implemented in an external controller. The SSD management features may include bad block table recovery. An indirection mapping data structure can maintain a mapping between logical block addresses used by a host computer and physical data storage locations on an SSD. Updates to the indirection mapping data structure can be stored in journals. One or more journals may be associated with a cluster block, such that the journals store updates to the indirection mapping data structure for that cluster block. Further, each physical chunk of media in a cluster block, including defective/bad blocks that are not programmed, or other non-host data such as padding or other meta data, are captured in the journal. The journal is said to be physical media aware because of this direct mapping. Using the bad block information already stored in the journals, the bad block table can be rebuilt following a loss of power or other problem. To ensure the journals can be located, a small seed can be stored in off band storage. The seed can include information pointing to a boot catalog stored on the SSD. The boot catalog can be used to determine the locations of journals, which may vary from their predetermined locations depending on the bad blocks of the drive. By storing a small seed, rather than an entire bad block table, the size of external storage needed to maintain the bad block table is reduced.

Figure 1:
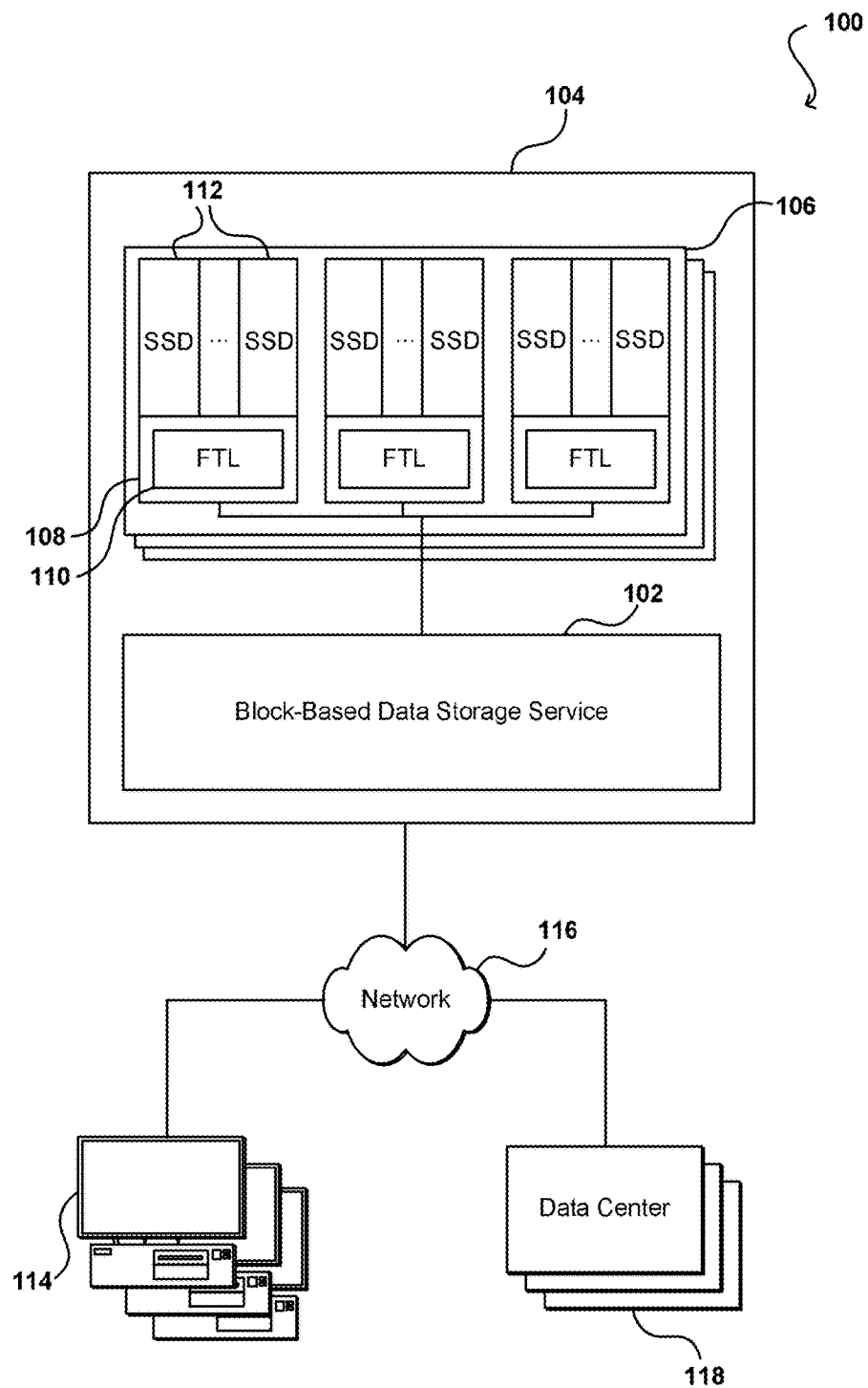
FIG. 1 illustrates an example environment in which aspects of various embodiments can be implemented.

FIG. 1 illustrates an example environment 100 in which aspects of various embodiments can be implemented. In this example configuration, a block-based data storage service 102 uses multiple block-based data storage systems in a data center 104 to provide reliable, non-local, block-based data storage to executing programs or various other components, systems, or services. Data center 104 includes a number of racks 106, each rack including a number of computing systems. The computing systems on the illustrated rack 106 each can include a controller 108, including a flash translation layer (FTL) 110 and one or more solid state drives (SSD) 112. Solid state drives typically include a controller that performs various management functions. However, in various embodiments, these functions are decoupled from the drive itself and provided by external controller 108. For example the flash translation layer 110 of controller 108 may provide journaling, replay, and other indirection mapping management services, as discussed further below. Although many of the disclosed embodiments are described as operating as part of a block-based data storage service, further embodiments can be used as part of other types of storage systems that use NAND flash storage. For example, particular embodiments include an object-based storage system.

As shown in FIG. 1, a block-based data storage service 102 can provision block storage devices for one or more host computing systems 114, virtual machines, and/or other services. In some embodiments, block storage devices may be accessed over a network 116, including a local network and/or an external network (e.g., the Internet or another public data network). In some embodiments, the data center 104 can be connected via the network 116 to one or more other data centers 118 that each may include some or all of the computing systems and storage systems illustrated with respect to data center 104. The host computing systems 114 may be operated by various parties for various purposes, such as by the operator of the data center or third parties (e.g., customers of the block-based data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be thousands of computing systems per data center, with at least some of those computing systems being host computing systems that may each host one or more virtual machines, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

In various embodiments, the block-based storage service can expose the storage to the customers as a Web service. Customers can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects.

Traditional solid state drives (SSDs) include a controller that provides various drive and data management features. For example, SSDs store data persistently in flash cells; however data cannot be overwritten and instead must be first erased before new data can be stored. Additionally, each cell has a finite number of write/erase cycles before it can no longer reliably store data. As such, to effectively manage data storage, SSD-specific garbage collection, replay, and trim methods may be implemented by the SSD controller. As discussed above, these features are provided by drive manufacturers and may not be suitable for all users. Many of the features provided by the controller can be decoupled from the SSD in accordance with various embodiments.

Figure 2:
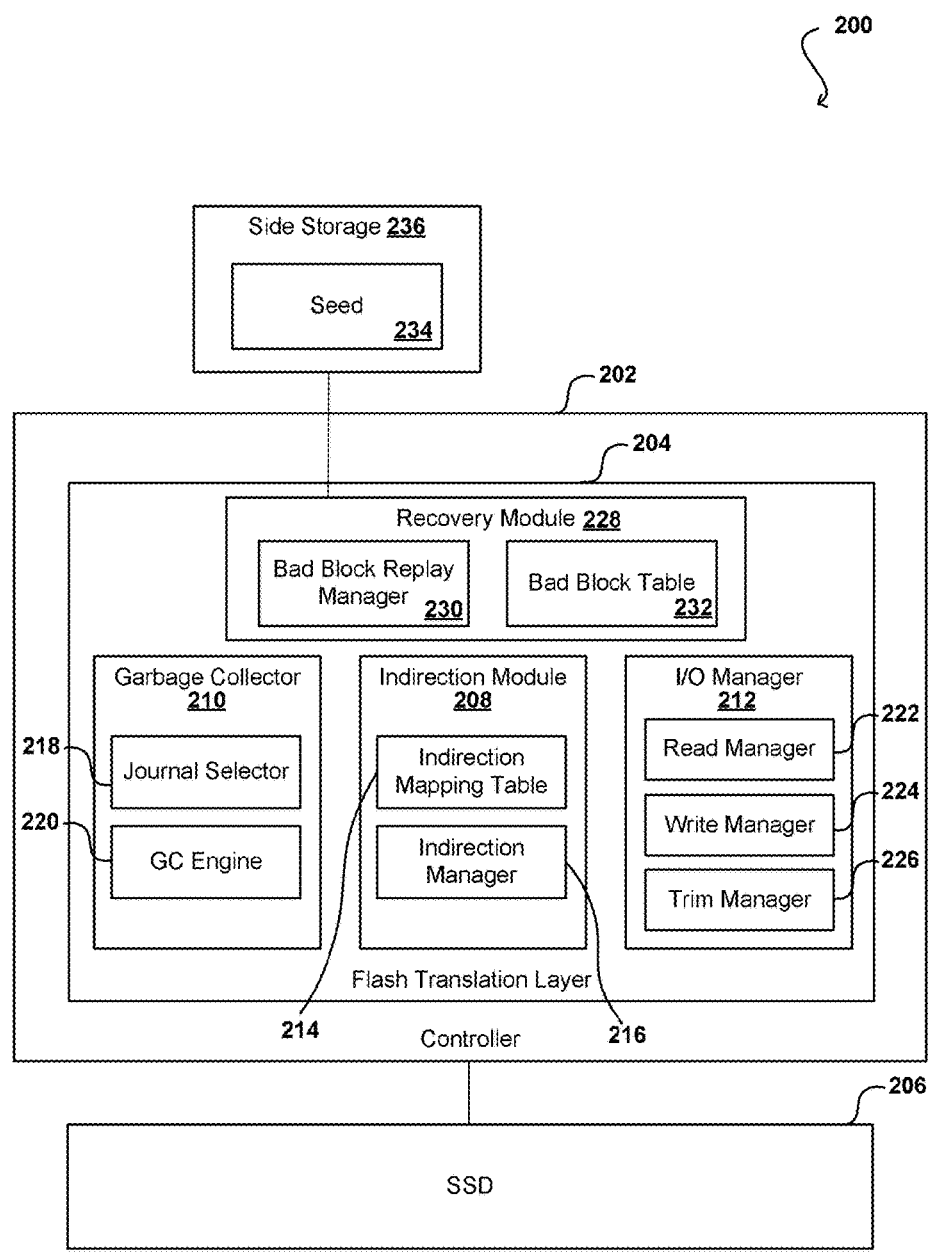
FIG. 2 illustrates block diagram of a flash translation layer for a solid state drive that can be utilized in accordance with various embodiments.

FIG. 2 illustrates block diagram 200 of a controller decoupled from a solid state drive that can be utilized in accordance with various embodiments. Controller 202 can include a flash translation layer (FTL) 204 which provides various data management features for a SSD 206. As shown in FIG. 2, FTL 204 can include indirection module 208, a garbage collector 210, and input/output manager 212. Many of these management features require locating where data is stored physically on the SSD. Indirection module 208 can manage these locations using an indirection mapping table 214 that maps logical block addresses, which are used by a host computing system, to the physical data locations on disk. These logical-to-physical mappings are described in indirection units stored in the indirection mapping table. An indirection manager 216 can enable indirection units in the indirection mapping table to be stored, modified, or updated. The indirection mapping table can be implemented as various data structures as would be known to one of ordinary skill in the art. In various embodiments, each indirection entry may represent multiple logically and physically contiguous data blocks.

Such indirection mapping tables can become quite large, increasing in size in proportion to the size of the SSD. The indirection mapping table may be maintained in volatile memory, such as RAM. This provides quick access to the mappings, but results in potential loss of the indirection mapping table in the event of a power failure or other unexpected power interruption. In various embodiments, and as discussed further below, a spatially coupled journaling scheme is implemented in which each time data is written to disk, a journal entry including logical address information can be added. Based on the location of the journal entry, the corresponding physical location can be inferred. Each journal has a finite size, storing a maximum number of corresponding entries. In some embodiments all journals are of the same size. In some embodiments journals can be of variable size. Additionally, each physical chunk of media, whether defective or not, is journaled. By including a journal entry for every physical chunk of media, the journals can be stored at predetermined locations, regardless of the locations of defective blocks (e.g., bad blocks) on the disk. When the journal has reached a predefined limit, the journal is stored to the SSD within the same cluster block and immediately after the data it describes. As the journal includes a finite number of entries, corresponding to a known amount of disk space, the location of the journal on disk, relative to the start of a cluster block (or the last journal storage location) is known deterministically.

As discussed, a flash block must be in an erased state before data can be stored to it (e.g., data cannot be overwritten to the same physical location unless it is first erased). To accommodate these characteristics, data can be written sequentially to the next available page. When new data is written and associated with the same logical address as previously written data, the previously written data is invalidated. Garbage collector 210 can ensure erased cluster blocks are available to store data, and to reduce data fragmentation. Garbage collector 210 can include a journal selector 218 that can retrieve journals from the predetermined locations and determine whether the data is valid. Garbage collection engine 220 can then relocate data as needed or ignore the data, leading to it being erased when the cluster block is erased. Input/output manager 212 can manage read and write access to the SSD 206. In various embodiments, read manager 222 and write manager 224 may include read and write caches that store data requested to be read or written. In various embodiments, a trim manager 226 can enable a client device (e.g., a computing or network device accessing or managing data on the SSD 206) to indicate a range of logical addresses that are stale and that can be discarded. By enabling ranges of logical addresses to be marked stale by the client, garbage collection overhead can be reduced.

As discussed, flash media, such as SSD 206, may include a plurality of flash blocks. A subset of these blocks may be indicated, or determined to be incapable of reliably storing data (e.g., "bad" blocks). For example, bad blocks may be identified by the drive manufacturer when the drive is produced. The manufacturer may provide a bad block table (BBT) with the drive that indicates which blocks are bad, and therefore should not be used to store data. Unfortunately in general it is not possible to deduce from a block itself whether the block is bad or good. The BBT may be saved on some "off band" storage (e.g., NOR flash, NVRAM, or another type of storage). The off band storage is sometimes referred to herein as "side storage" and can be physically separate from the SSD 206, the controller 202, or both. As drive size increases, the size of the BBT typically also increases (e.g., hundreds of KB), requiring larger off band storage. Such storage can be expensive and is often slow, which may lead to recovery delays following a power loss.

As noted, the spatially coupled journals are stored deterministically, at known locations. However, when a journal location falls on a bad block, the journal is stored to the next available location. As such, journal locations are not known deterministically, unless the bad block table is available. Because each physical chunk of media, whether defective or not, is journaled, the spatially coupled journals may be used to rebuild the bad block table in the event of damage, corruption, or other loss of data. This may be managed by recovery module 228. Recovery module 228 may include a bad block replay manager 230 and bad block table 232. Recovery module 228 may use a seed 234, stored in side storage 236, to recover the spatially coupled journals to rebuild the bad block table 232. As discussed further below, the seed 234 may be a small (e.g., 10s of bytes) piece of data that points to a boot catalog stored on the SSD 206. Once the boot catalog is recovered, it may be used to determine locations of the Journals on the SSD which are to be replayed during recovery.

FIG. 3 illustrates a diagram 300 of a flash array in accordance with various embodiments. Cluster block 302 represents a grouping of contiguous die 304 on an SSD. This grouping may include physical erase blocks across an array of N contiguous die. The grouping of physical erase blocks may include the same block index from each die to simplify translation from logical to physical erase blocks. In embodiments using multi-plane programming on a die, P consecutive blocks from each of the N die can be grouped into a single cluster block, where P is the number of planes supported by the NAND die. When data is stored to disk, it is stored on one or more pages 306 of the cluster block 302. Although the example cluster block 302 shown in FIG. 3 includes five die 302 and six pages 304, alternative configurations may also be used. Additionally, cluster blocks may be variable in length. In this example, each dashed box represents the amount of physical space on the SSD that is written during a write operation. Each number inside each dashed box indicates an ordering in which indirection units are laid out on the cluster block. As data is written to the cluster block, corresponding entries are stored in a journal, with each entry corresponding to an indirection unit in the order shown. This example is continued in FIG. 4.

Figure 4:
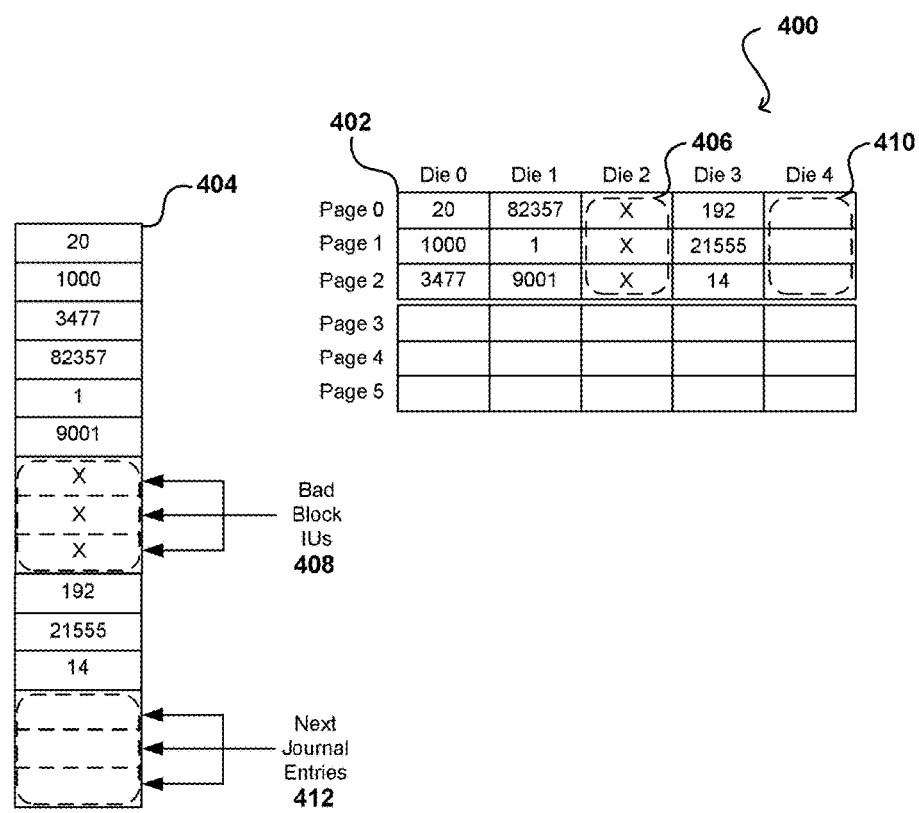
FIG. 4 illustrates a journal and a flash array in accordance with various embodiments.

FIG. 4 illustrates a diagram 400 of a journal and flash array in accordance with various embodiments. As shown in FIG. 4, cluster block 402 stores data corresponding to logical block addresses. Journal 404 can be maintained in RAM and include the logical block addresses for data stored in the cluster block. The journal can be updated in the same order as data is written to disk. As shown above with respect to FIG. 3, data is written to disk in a particular order. For example, the first three entries of journal 404 correspond to die 0, pages 0-3, reflecting the order in which the data was written. By updating the journal in the same order, each entry in the journal corresponds to a known location on the disk. The journal includes entries for each physical portion of media, even if that portion is not written to, e.g., including defective or skipped blocks, such that the journal remains synchronized with the data on disk. For example, as shown in FIG. 4, dashed box 406 includes defective blocks indicated as having value X. These defective blocks, also referred to as bad blocks, may be identified using a bad block table, or through detection of an error during writing or during a subsequent read of the defective location. The journal 404 includes entries for every portion of physical disk, including the defective blocks, shown in journal entries 408. As discussed further below, this enables the spatially coupled journals to be used not only to rebuild the indirection map, but also to rebuild a bad block table on demand. As shown in FIG. 4, following defective blocks, the journal 404 may continue to include entries in order, as described above. For example, dashed box 410 indicates the next portion of disk to be written which corresponds to the next three entries 412 of journal 404.

In some embodiments, each journal 404 can be the same size. Once the journal has filled all of its entries, it can be stored to cluster block 402. For example, the size of the journal can be made equal to the size of an indirection unit such that the journal can be written in a single write operation and the next journal can include entries starting with the next indirection unit. Since each journal is stored at a predetermined location, each journal includes entries that map a fixed amount of physical media to logical units. Where these logical units are of fixed size, each journal has a fixed number of journal entries. If the logical units are of variable sizes, e.g., where compression is used, journals are still stored at predetermined locations. To enable the journals to be stored at the predetermined locations, each journal may include a variable number of entries. When entries corresponding to the fixed amount of physical disk space have been journaled, the journal can be closed and stored at the predetermined location. In this example, each journal may include a different number of journal entries, but will be stored at predetermined locations and cover a fixed amount of physical disk space.

Figure 5:
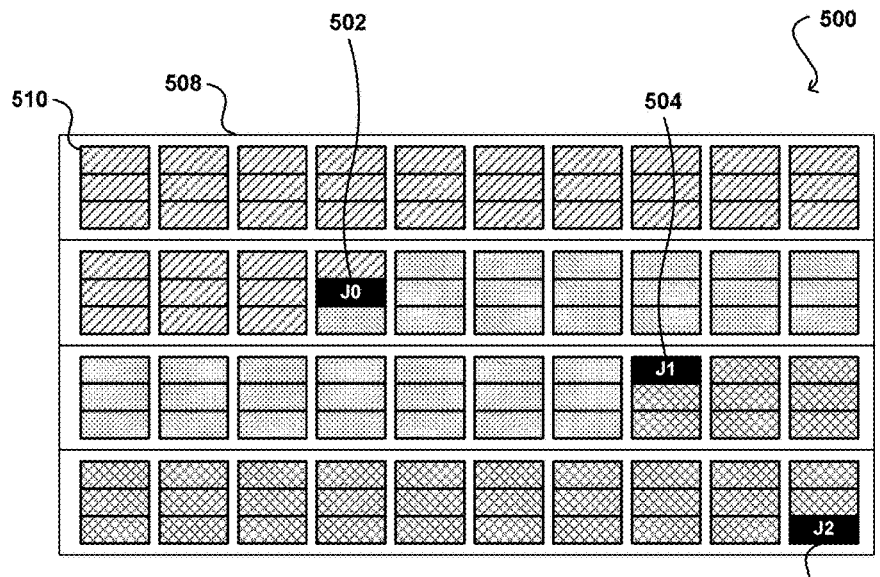
FIG. 5 illustrates a diagram of spatially coupled journals in accordance with various embodiments.

FIG. 5 illustrates a diagram 500 of spatially coupled journals in accordance with various embodiments. As described above, a journal can be stored to disk in the same cluster block in-line with the data described in the journal. This is referred to as spatially coupled, as the journal and data are co-located. Additionally, because data is stored to disk in a particular order, each physical chunk of media is journaled including bad blocks, and the journals are of finite size, each journal is stored at a physical location on disk that is known deterministically from the start of a cluster block. In some embodiments, a journal can be stored upon detection of a journal storage event. As discussed, one example of a journal storage event is determining that the journal is full. When the journal is determined to be full, it can be saved to the next physical location on the cluster block. As shown in FIG. 5, multiple journals 502, 504, 506 can be spatially coupled to cluster block 508, each journal including indirection entries for data stored in the cluster block for indirection units before the journal but after any earlier stored journal. For example, journal 502 can include indirection entries for indirection units starting at the beginning 510 of cluster block 508 until the indirection unit immediately before journal 502. Similarly, journal 504 can include indirection entries for indirection units after journal 502 and immediately before journal 504.

As shown in this example, each journal is stored at a physical location that is known deterministically from the beginning of the cluster block, based on the size of the journal. For example, each journal in FIG. 5 stores 40 indirection entries, and is stored in the next indirection unit. To ensure the journals are stored at predetermined locations, a write placement manager can be configured to store the journal immediately upon detection of a journal storage event into the next indirection unit. Additionally, each journal is tied to a specific cluster block. As such, a journal that includes indirection units for a cluster block is stored in that cluster block. This may result in journals being closed before they are full. As such, another example of a journal storage event is determining that the cluster block is nearly full (e.g., has one, or other configurable number, remaining indirection unit). As shown in FIG. 5, journal 506 is closed at the end of the cluster block having three fewer entry than journals 502 or 504. Although the example of FIG. 5 shows journals having a small number of journal entries, this is for simplicity of depiction and explanation. In various embodiments, journals having more or fewer entries may be used. For example, if a journal is sized to match a 32 KiB indirection unit, each journal entry is 32 bits, and each journal includes a 20 byte header, the journal can include approximately 8,000 journal entries before being stored to disk. Such a journaling scheme enables a single 32 KiB journal to include indirection entries for approximately 256 MiB of data.

In some embodiments, the predetermined location where a journal is to be stored on the physical media may be defective (e.g., as of media production or due to use or other factor). In some embodiment, N contiguous locations on the physical media may be predetermined for each journal, where N can be defined to be any integer. For example, a predetermined location for a journal may correspond to 2 predetermined contiguous pages on an SSD. Although this increases the amount of space on the physical media dedicated to the journals, it provides layers of redundancy to ensure the fixed-location journaling scheme can still be used if one of the predetermined locations is defective. In some embodiments, defective locations can be remapped to non-defective locations logically. For example, a map of defective blocks mapped to journal locations can be maintained and remapped during device initialization to one or more non-defective locations. This remapping can be done by the SSD firmware or at the flash device level (if supported).

In some embodiments, where the number of dies in a cluster block is equal to or greater than the number of journals used in a cluster block, each journal can be stored to a different die. For example, as shown in FIG. 5, each journal 502, 504, 506 is stored to a different die. If a physical block in the cluster block exhibits a failure only a single journal is affected. To ensure journals are staggered across different dies, each journal can include a variable number of journal entries. Because the entire physical media is journaled, the number of journal entries can be predefined so that when full each journal is stored to a different die.

In some embodiments, if the number of dies in a cluster block is equal to or greater than double the number of journals used in a cluster block, then each journal can be duplicated and stored to a different die. If any die fails, no journals will be lost, as the corresponding copy can be recovered from its location on another die. Additionally, or alternatively, redundant array of independent disks (RAID) can be used to provide additional protection to the journals. For example, RAID 5 parity can be accumulated across all journals in the cluster block and saved for recovery in the event of a read failure on a journal.

Embodiments described above assume that each indirection entry corresponds to a fixed amount of disk space such that after a particular number of entries (e.g., the size of the journal) the journal is stored at a predetermined location. However, where compression algorithms are used, each entry may not correspond to the same amount of disk space. As such, if the journal is of fixed size and it is stored when it is filled, it may not be stored at a predetermined location. In some embodiments, a variable sized journal may be used that can be stored to disk upon detection that data has been written up to a predetermined location. For example, a write placement manager can keep track of write locations and cause the journal to be written to disk at a predetermined location. The journal can be closed and written to disk at the predetermined location regardless of the size of the journal, such that it can be later recovered from the predetermined location.

In some embodiments, because each journal is stored at a predetermined location, techniques may be used to reduce the likelihood of a defect at one of these locations. For example, some SSDs may be written in a single level cell (SLC) mode, where each cell stores a single bit of data, or a higher density storage mode such as multi-level cell (MLC) mode or triple level cell (TLC) mode where two bits or three bits, respectively may be stored per cell. SLC mode enables less data to be stored than MLC or TLC mode, but that data is stored more reliably. Accordingly, in some embodiments, user data may be stored to disk in MLC or TLC mode to maximize storage density. When a journal is stored in-line with the user data as discussed herein, it can be stored in SLC mode. This reduces the likelihood of a defect at the predetermined locations where the journals are stored, making the journals more robust. For example, journals 502, 504, 506, may be written in SLC mode, while all other indirection units shown in FIG. 5 may be written in TLC mode.

Figure 6:
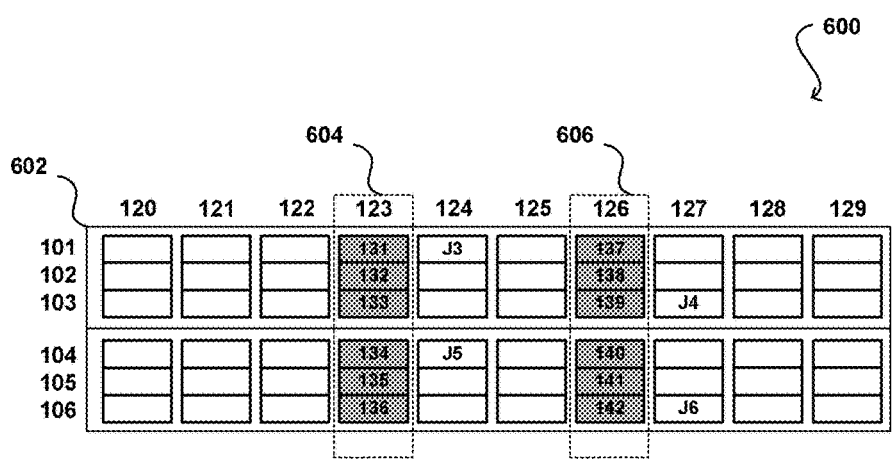
FIG. 6 illustrates a diagram of spatially coupled journals and bad blocks in accordance with various embodiments.

FIG. 6 illustrates a diagram 600 of spatially coupled journals and bad blocks in accordance with various embodiments. As noted above, spatially coupled journals may be stored to predetermined locations, co-located with the data described in the journals. However, if one of the predetermined locations falls on a bad block, the journal must be stored to a different location, such as the next available location. As shown in FIG. 6, an example portion of a cluster block 602, including six cluster pages 101-106 spanning ten dies 120-129. In this example, four journals, J3-J6, are stored to predetermined locations within this portion of the cluster block 602. However, this portion of the cluster block 602 also includes two bad blocks: physical blocks 123 and 126. This means that data cannot be stored to any of the locations within these blocks, as depicted at 604 and 606. In this example, the predetermined locations of journals J3 and J5 fall on these bad blocks, at locations 133 and 136. Accordingly, journals J3 and J5 have been moved to the next available locations (in this example, to the next page). This different location may not be known or knowable, in the absence of a bad block table and/or other storage metadata. As such, to find the locations of the Journals J3 and J5 it is therefore necessary to know beforehand that locations 133 and 136 are bad.

Accordingly, typically the BBT has to be known before replay can be performed, because replay requires the spatially coupled journals to be read. As noted, the BBT can be quite large, since in some cases the number of bad blocks in a drive can amount to tens of thousands. However because the spatially coupled journals include information for every portion of the physical disk, including bad blocks, the BBT data becomes redundant when using spatially coupled journals. As such, it is only required to store information of such bad blocks which could affect journal locations or, alternatively, locations of those journals which are to be moved due to their predefined locations being bad. The cost of specialized hardware storage devices with sufficient capacity is often prohibitive, and requiring the ability to save/restore several copies of a large BBT introduces undesirable delays and latencies. By storing data corresponding to the affected journals, the amount of data being stored can be reduced by orders of magnitude compared to a full BBT table. This allows the data to be stored reliably and cheaply.

Figure 7:
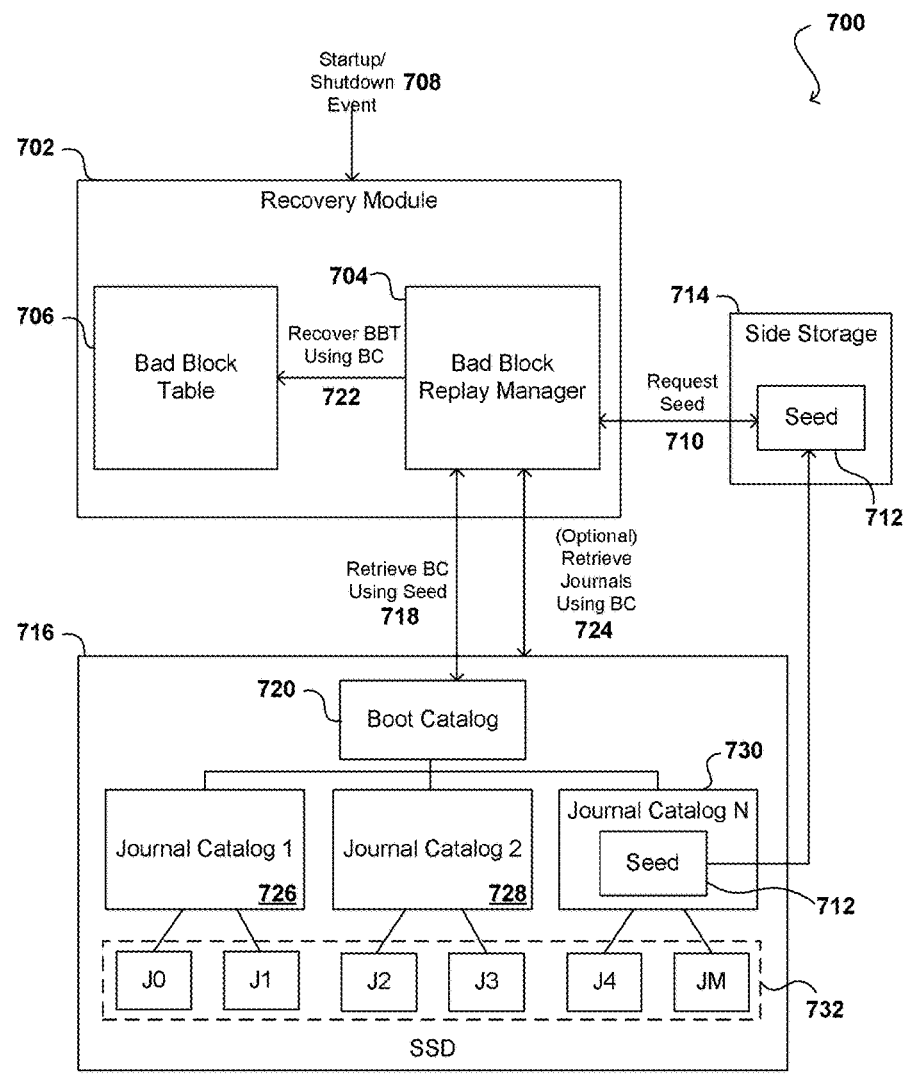
FIG. 7 illustrates a block diagram of a recovery module that can be utilized in accordance with various embodiments.

FIG. 7 illustrates a block diagram 700 of a recovery module that can be utilized in accordance with various embodiments. As discussed above, various management functions can be decoupled from an SSD and provided by an external controller, such as controller 202 shown in FIG. 2. As shown in FIG. 7, a recovery module 702 can include a bad block replay manager 704 which may be configured to rebuild a bad block table 706 during startup. In some embodiments, bad block table 706 can include a bitmap of the bad blocks and an array of information about each bad block. In various embodiments, the array information contains, for example: a type of the bad block (e.g., a bad block that exists due to a program failure on the media, or a bad block that exists due to an erase failure on the media); a point in the drive's lifespan at which the bad block is created (e.g., in terms of the current program or erase cycle count for the block); and/or a time when the bad block was retired. As discussed, each portion of the storage media is journaled, including defective blocks. This enables bad block table 706 to be reconstructed in case it is lost or corrupted. In some embodiments, bad block table 706, once recovered, can be maintained in memory, cache, or other low latency storage accessible to recovery module 702. This reduces calls to the complete bad block table (which, as discussed above, is typically stored in slow, off band storage) and therefore shortens startup time.

In some embodiments, when a startup event 708 is detected (e.g., when power is restored after a failure or other event), bad block replay manager can request 710 a seed 712 from a side storage location 714. Side storage 714 may include NOR flash, non-volatile RAM, or other storage. At startup, SSD 716 is not readable because the bad block table is not available. Therefore, by storing the seed 712 in a side storage location, and not on the SSD 716, the seed is accessible at startup. In some embodiments, side storage 714 may be an I2C NOR flash included in SSD 716, but separate from the NAND flash of the SSD where user data is stored. Seed 712 can include information that identifies where on SSD 716 (e.g., NAND storage location) a boot catalog 720 is stored. ("Boot catalog" is sometimes abbreviated as "BC" in FIG. 7.) In some embodiments, the seed may include a physical address on the SSD where the boot catalog is stored. The bad block replay manager can extract the location from the seed and retrieve 718 the boot catalog 720 from the SSD 716. The boot catalog 720 may then be used to locate the spatially coupled journals on the SSD. Once the spatially coupled journals have been retrieved, the journals can be replayed and the bad block table can be recovered 722.

In some embodiments, the boot catalog 720 may include a list of bad blocks which affect journal placement. For example, returning to FIG. 6, bad block 604 caused journals J3 and J5 to be stored in locations that are different from their expected, predetermined locations, while bad block 606 did not affect the locations of journals J4 and J6. As such, the corresponding boot catalog for this example may include bad block 604, but not bad block 606. By including only the bad blocks that affect journal locations, the size of the boot catalog can be kept small. During replay, the journals can be retrieved from the predetermined locations and the affected journals can be retrieved from the next available location after the bad block. Alternatively, in some embodiments, the boot catalog may include the locations of journals that were moved due to bad blocks. Staying with the example of FIG. 6, the boot catalog may include the relocated physical locations of journals J3 and J5 in block 124. During replay, the journals can be retrieved from the predetermined locations and the affected journals can be retrieved 724 from the locations identified in the boot catalog.

In some embodiments, each cluster block can include a journal catalog 726, 728, 730. Each journal catalog can include the locations of the journals 732 stored in the journal catalog's corresponding cluster block. As shown in FIG. 7, boot catalog 720 may include locations of each journal catalog. When a journal catalog is written to disk, the journal catalog can include locations of the other journal catalogs that exist at time of writing. During replay, the journal catalogs can be retrieved 724 from each cluster block. The journal locations in each cluster block can be read from each journal catalog and retrieved from the SSD. In some embodiments, instead of a hierarchical structure, the boot catalog may instead include a list of all journal locations. During replay, the journal locations can be read from the boot catalog and retrieved. When the journals have been retrieved, the bad block table may then be recovered.

When a shutdown event 708 is detected, seed 710 can be stored to side storage 714 before the shutdown event completes. For example, the seed can include a location of the current boot catalog, such as the last written catalog 730. Subsequently on boot, the seed 712 can be retrieved and replay may be performed as discussed.

Figure 8:
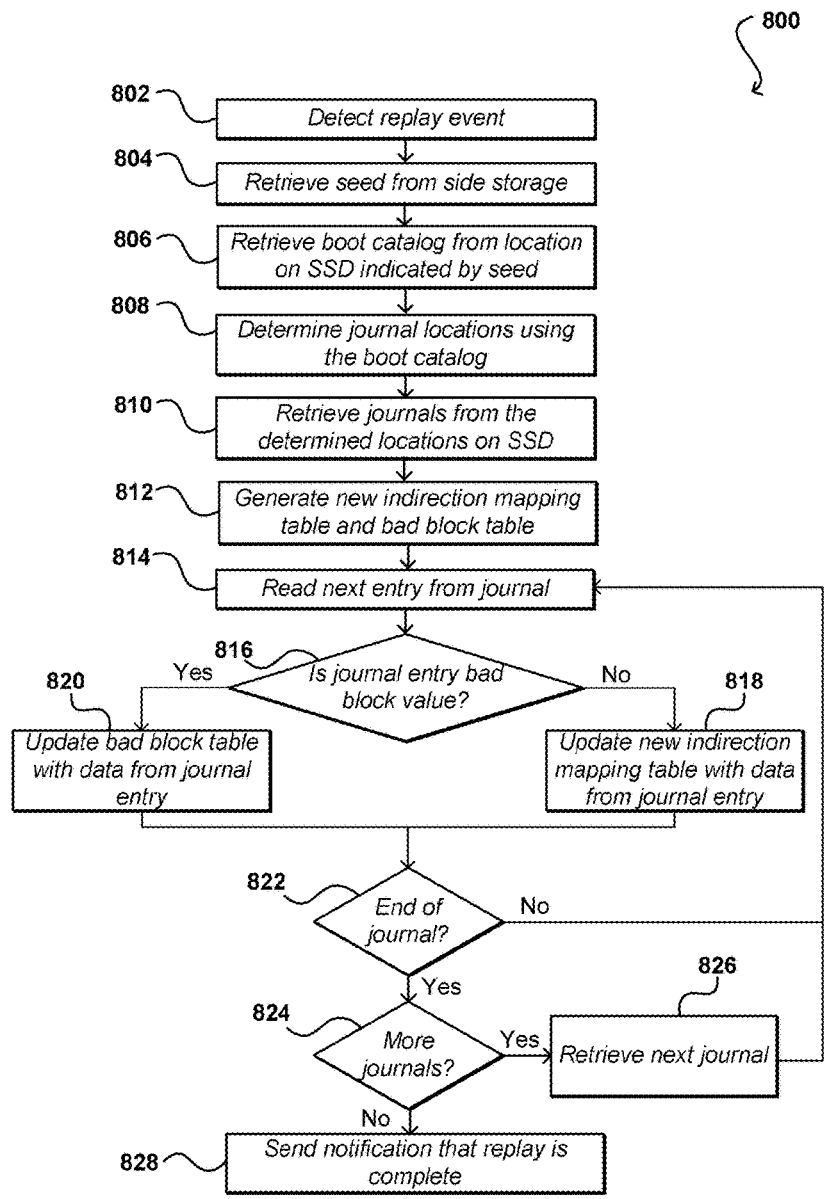
FIG. 8 illustrates a block diagram of a method of bad block table recovery using spatially coupled journals that can be utilized in accordance with various embodiments.

FIG. 8 illustrates a block diagram of a method 800 of bad block table recovery using spatially coupled journals that can be utilized in accordance with various embodiments. A replay event can be detected 802. For example, a replay event may be a boot up event, a power outage, a replay request, or other event. A seed can be retrieved 804 from an off band location. As discussed, the off band location may include a flash media separate from the SSD, such as a NOR flash, or other media. The seed can include information indicating a location of a boot catalog stored on the SSD. The boot catalog can be retrieved 806 from the location indicated by the seed.

In some embodiments, the boot catalog can be used to determine 808 the locations of journals stored on the SSD. As discussed, the spatially coupled journal locations may be predetermined, however due to bad blocks some journals may be stored to different locations. In some embodiments, the boot catalog may include a list of bad blocks which affect journal placement. Journal locations that fall on the listed bad blocks can be determined to be in the next available location from the bad block (e.g., in the next block). Alternatively, in some embodiments, the boot catalog may include the locations of journals that were moved due to bad blocks. The journal locations may be determined to be the predetermined locations plus the listed journal locations from the boot catalog. In some embodiments, the boot catalog can list all journal locations. Alternatively, in some embodiments, the boot catalog may reference a hierarchy of journal catalogs, each including locations of corresponding journals on a given cluster block. Each journal catalog can be retrieved from each cluster block, and the journal locations in each cluster block can be read from each journal catalog and retrieved from the SSD. After the journal locations have been determined, the journals can be retrieved 810 from the determined locations on the SSD. In some embodiments, a last written journal catalog can include storage locations of any journal catalogs written to the SSD before the last written journal catalog. The seed may then include a location on the SSD where the last written journal catalog is stored. Once retrieved, the last journal catalog may serve as the boot catalog, pointing to the locations of all other journal catalogs on the SSD.

Rebuilding the bad block table and the indirection mapping table can include creating 812 a new bad block table and a new indirection mapping table. An entry can be read 814 from the current journal being parsed. As discussed, each portion of media is associated with a journal entry, including defective portions where no data is stored. The journal entry can be analyzed to determine 816 whether it includes a value indicating that the corresponding physical location is defective. If the journal entry does not indicate that it is defective, the new indirection mapping table can be updated 818 using the mapping data from the journal entry. If the journal entry does indicate that it is defective, then a bad block map can be updated 820 to include the corresponding physical location to the journal entry.

Once the journal entry has been processed, it can be determined 822 whether the end of the journal has been reached. If additional entries exist, processing may return to block 814 and the next entry can be processed. If the end of the journal has been reached, it can be determined 824 whether additional journals exist. In some embodiments, each journal may include journal header data. For example, the header may include a timestamp when the journal was written, when the first entry was written, when the last entry was written, or other data. Additionally, or alternatively, the journal header may include a total number of journals, updated each time a new journal is stored. In various embodiments, the data in the journal header may be used to determine an order in which to process the journals. If additional journals exist, the next journal can be retrieved 826 from its location determined from the boot catalog and the entries of the next journal can be processed as discussed above with respect to blocks 814-822. If no additional journals exist, a notification can be sent 828 indicating replay is complete. Once complete, the indirection mapping table and bad block map have each been rebuilt. Although the embodiment of FIG. 8 describes the indirection mapping table and bad block map being rebuilt during the same replay operation, in various embodiments, replay may be performed to rebuild either the indirection mapping table or the bad block map alone. For example, a request may be received to rebuild the bad block map without also rebuilding the indirection mapping table. In such an example, at step 816, if the journal entry does not include a bad block value, processing may proceed directly to step 822.

Figure 9:
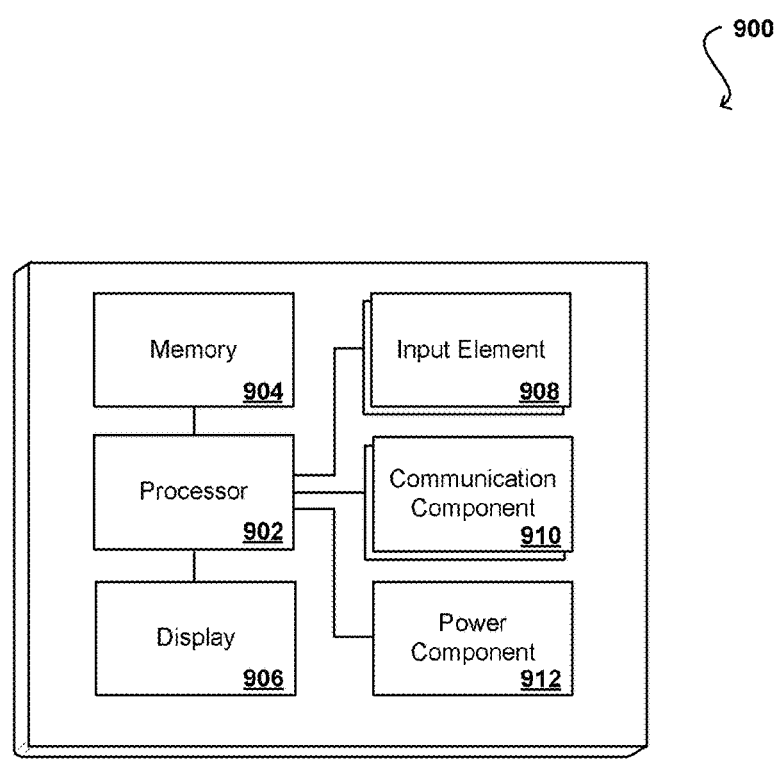
FIG. 9 illustrates components of an example computing device that can be used to perform aspects of the various embodiments.

FIG. 9 illustrates a logical arrangement of a set of general components of an example computing device that can be used to implement aspects of the various embodiments. In this example, the device includes a processor 902 for executing instructions that can be stored in a memory device or element 904. The device can include many types of memory (e.g., RAM, ROM, flash), data storage, or non-transitory computer-readable storage media, including a first data storage for program instructions for execution by the processor 902, a separate storage for data, a removable memory for sharing information with other devices, etc. The instructions can comprise software and/or software for implementing embodiments of any of the disclosed methods and can be written in any suitable programming language. The device may include some type of display element 906, such as a touch screen or liquid crystal display (LCD), although devices such as portable media players might convey information via other means, such as through audio speakers. In some embodiments, the computing device 900 can include one or more networking and/or communication elements 908, such as a wired or wireless communication system. The device in many embodiments can communicate with a network, such as the Internet, and may be able to communicate with other such devices. In some embodiments the device can include at least one additional input component 910 able to receive conventional input from a user. The device will also include one or more power components 912, such as a power source, battery compartment, wireless charging circuitry, and the like, for providing and/or obtaining the power needed for the computing device.

As discussed, different approaches can be implemented in various environments in accordance with the described embodiments. An illustrative environment can include at least one server and a data store. It should be understood that there can be several servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The server can include any appropriate hardware and software for integrating with the data store as needed to execute aspects of one or more applications for a client device, including a storage service application. It should be understood that the servers are not required and are merely example components, as software discussed herein can be executed on any appropriate device or host machine.

The environment in one embodiment is a distributed computing environment utilizing several computer systems and components that are interconnected via communication links, using one or more computer networks or direct connections Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   detect a boot event of a solid state drive (SSD), the SSD including a plurality of journals stored at predetermined locations on the SSD co-located with user data;
   determine a seed located in an external storage and occupying less space than a bad block table for the SSD;

retrieve the seed from the external storage location, the seed specifying a location of a boot catalog stored on the SSD;

retrieve the boot catalog from the location specified by the seed, the boot catalog including locations of journal catalogs stored on the SSD, each journal catalog corresponding to a different cluster block of the SSD;

retrieve journals from locations on the SSD specified by the journal catalogs, at least one journal being retrieved from a location different from its predetermined location; and generate the bad block table using the journals.

2. The system of claim 1, wherein the instructions, when executed, further cause the system to:
detect a shutdown event;
generate an updated seed including a location of an updated boot catalog; and
store the updated seed to the external storage location.

3. The system of claim 1, wherein the instructions to generate the bad block table using the journals, when executed, further cause the system to: read one of the journals; determine that an entry from the one of the journals includes a bad block value; and update the bad block table to include a location corresponding to the determined entry.

4. The system of claim 1, wherein the seed indicates a location on the SSD where a last written journal catalog is stored, the last written journal catalog including locations of any journal catalogs written prior to the last written journal catalog.

5. A computer-implemented method, comprising:
detecting an event of a solid state drive (SSD), the SSD including a plurality of journals;
determining a seed located in an off band storage and occupying less space than a bad block table for the SSD
retrieving the seed from the off band storage location, the seed specifying a location of a boot catalog stored on the SSD;
determining locations of the journals stored on the SSD using the boot catalog;
retrieving the journals from the SSD; and
generating the bad block table using the journals.

6. The computer-implemented method of claim 5, wherein the journals are associated with predetermined locations in the SSD and the boot catalog includes a journal location that is relocated due to a bad block in the SSD.

7. The computer-implemented method of claim 5, wherein the boot catalog includes a location of a bad block corresponding to a predetermined journal location.

8. The computer-implemented method of claim 5, wherein the boot catalog includes a list of the locations of the journals.

9. The computer-implemented method of claim 5, wherein the boot catalog includes locations of a plurality of journal catalogs stored on the SSD, each journal catalog including locations of journals stored on a given cluster block of the SSD.

10. The computer-implemented method of claim 5, further comprising:
detecting a shutdown event;
generating an updated seed, the updated seed including a location of an updated boot catalog; and
storing the updated seed to the off band storage location.

11. The computer-implemented method of claim 5, wherein
generating a bad block table using the plurality of journals further comprises:
reading a journal from the plurality of journals;
determining that an entry from the journal includes a bad block value; and
updating the bad block table to include a location corresponding to the entry.

12. The computer-implemented method of claim 5, wherein the bad block table is a bitmap.

13. A system, comprising:
a solid state drive (SSD);
at least one processor; and
memory including instructions that, when executed by the at least one processor, cause the system to:
detect an event of the SSD, the SSD including a plurality of journals;
determine a seed located in a side storage location and occupying less space than a bad block table for the SSD;
retrieve the seed from the side storage location, the seed specifying a location of a boot catalog stored on the SSD;
determine locations of the journals stored on the SSD using the boot catalog;
retrieve the journals from the SSD; and
generate the bad block table using the journals.

14. The system of claim 13, wherein the retrieving the seed is performed by a bad block replay manager.

15. The system of claim 13, wherein the at least one processor is a controller for a storage system.

16. The system of claim 15, the system further comprising a flash translation layer in the controller, the flash translation layer comprising a recovery module, wherein the bad block table is generated by the recovery module.

17. The system of claim 13, wherein the boot catalog includes locations of journal catalogs stored on the SSD, each journal catalog including locations of journals stored on a different cluster block of the SSD.

18. The system of claim 17, wherein the instructions to determine locations of the plurality of journals stored on the SSD using the boot catalog, when executed, further cause the system to:
retrieve the plurality of journal catalogs stored on the SSD using the boot catalog; and
read the locations of the journals on each cluster block from the journal catalogs.

19. The system of claim 18, wherein a last written journal catalog includes storage locations of any journal catalogs written to the SSD before the last written journal catalog, and the seed includes a location on the SSD where the last written journal catalog is stored.

20. The system of claim 13, wherein the side storage location is a flash data store separate from the SSD and accessible through an I2C interface.

* * * * *